United States Patent
Sakamoto et al.

(10) Patent No.: US 10,352,310 B2
(45) Date of Patent: Jul. 16, 2019

(54) COMPRESSED AIR STORAGE AND POWER GENERATION DEVICE AND COMPRESSED AIR STORAGE AND POWER GENERATION METHOD

(71) Applicant: Kobe Steel, Ltd., Hyogo (JP)

(72) Inventors: Kanami Sakamoto, Takasago (JP); Hiroki Saruta, Takasago (JP); Masaki Matsukuma, Kako (JP)

(73) Assignee: Kobe Steel, Ltd., Hyogo (JP)

( * ) Notice: Subject to any disclaimer, the term of this patent is extended or adjusted under 35 U.S.C. 154(b) by 285 days.

(21) Appl. No.: 15/323,755

(22) PCT Filed: Jul. 28, 2015

(86) PCT No.: PCT/JP2015/071374
§ 371 (c)(1),
(2) Date: Jan. 4, 2017

(87) PCT Pub. No.: WO2016/017639
PCT Pub. Date: Feb. 4, 2016

(65) Prior Publication Data
US 2017/0159649 A1    Jun. 8, 2017

(30) Foreign Application Priority Data
Jul. 31, 2014    (JP) .................. 2014-156756

(51) Int. Cl.
    *F04B 23/02*      (2006.01)
    *F03D 9/00*       (2016.01)
    (Continued)

(52) U.S. Cl.
    CPC .............. *F04B 23/02* (2013.01); *F03D 9/007* (2013.01); *G06F 19/00* (2013.01); *H02J 15/006* (2013.01);
    (Continued)

(58) Field of Classification Search
CPC .. F03D 9/007; F03D 9/17; F04B 23/02; F15B 1/022; F15B 1/024; F15B 1/033;
(Continued)

(56) References Cited

U.S. PATENT DOCUMENTS 4,229,661 A    10/1980    Mead et al.
7,832,207 B2 *   11/2010    McBride ................. F15B 1/024
                                                         60/410
(Continued)

FOREIGN PATENT DOCUMENTS

EP           1536541 A1    6/2005
JP         H07-317649 A   12/1995
(Continued)

OTHER PUBLICATIONS

Machine Translation of JP 2002-135979 A; pub. date May 10, 2002.*
(Continued)

*Primary Examiner* — Michael Leslie
*Assistant Examiner* — Daniel S Collins
(74) *Attorney, Agent, or Firm* — Studebaker & Brackett PC

(57) ABSTRACT

A compressed air storage and power generation device (1) is provided with motors (3a-3c), compressors (4a-4c), compressed air storage tanks (5a-5c), injection-side valves (6a-6e), expanders (7a-7c), discharge-side valves (8a-8e), generators (9a-9c), an output sensor (10), pressure sensors (11a-11c), and a control device (12). The control device (12) uses a tank (5c) with a relatively large capacity for long-period variable power and uses tanks (5a, 5b) with relatively low capacities for short-period variable power, all such power having been generated using natural energy, and thereby performs control by which both the long-period and short-period variable power are leveled out and power is (Continued)

output according to the power demand. The compressed air storage power generation device (1) levels out both the long-period and short-period variable power and outputs the power according to the power demand.

12 Claims, 16 Drawing Sheets

(51) Int. Cl.
*G06F 19/00* (2018.01)
*H02K 7/18* (2006.01)
*H02J 15/00* (2006.01)
*F03D 9/17* (2016.01)

(52) U.S. Cl.
CPC .............. *H02K 7/1823* (2013.01); *F03D 9/17* (2016.05); *Y02E 10/725* (2013.01); *Y02E 60/15* (2013.01)

(58) Field of Classification Search
CPC ...... G06F 19/00; H02J 15/006; H02K 7/1823; Y02E 10/725; Y02E 60/15
See application file for complete search history.

(56) References Cited

U.S. PATENT DOCUMENTS

| | | | |
|---|---|---|---|
| 8,821,108 B2* | 9/2014 | Nayebi | F03D 7/028 415/37 |
| 2003/0033811 A1 | 2/2003 | Gerdes | |
| 2003/0105556 A1 | 6/2003 | Enis et al. | |
| 2004/0267466 A1 | 12/2004 | Enis et al. | |
| 2005/0016165 A1 | 1/2005 | Enis et al. | |
| 2005/0225091 A1 | 10/2005 | Enis et al. | |
| 2006/0089805 A1 | 4/2006 | Enis et al. | |
| 2006/0232895 A1 | 10/2006 | Enis et al. | |
| 2007/0182160 A1 | 8/2007 | Enis et al. | |
| 2008/0172279 A1 | 7/2008 | Enis et al. | |
| 2009/0256362 A1 | 10/2009 | Enis et al. | |
| 2011/0094212 A1 | 4/2011 | Ast et al. | |
| 2012/0102937 A1 | 5/2012 | Anikhindi et al. | |
| 2014/0091574 A1 | 4/2014 | Favy | |

FOREIGN PATENT DOCUMENTS

| | | |
|---|---|---|
| JP | 2002-135979 A | 5/2002 |
| JP | 2003-083082 A | 3/2003 |
| JP | 2005-530074 A | 10/2005 |
| JP | 2009-525432 A | 7/2009 |
| JP | 2011-234563 A | 11/2011 |
| JP | 2012-097737 A | 5/2012 |
| JP | 2012-239370 A | 12/2012 |
| JP | 2013-509529 A | 3/2013 |
| JP | 2014-515339 A | 6/2014 |

OTHER PUBLICATIONS

The extended European search report issued by the European Patent Office dated Feb. 20, 2018, which correspond to European Patent Application No. 15827858.0-1202 and is related to U.S. Appl. No. 15/323,755.

International Search Report issued in PCT/JP2015/071374; dated Sep. 29, 2015.

Written Opinion issued in PCT/JP2015/071374; dated Sep. 29, 2015.

* cited by examiner

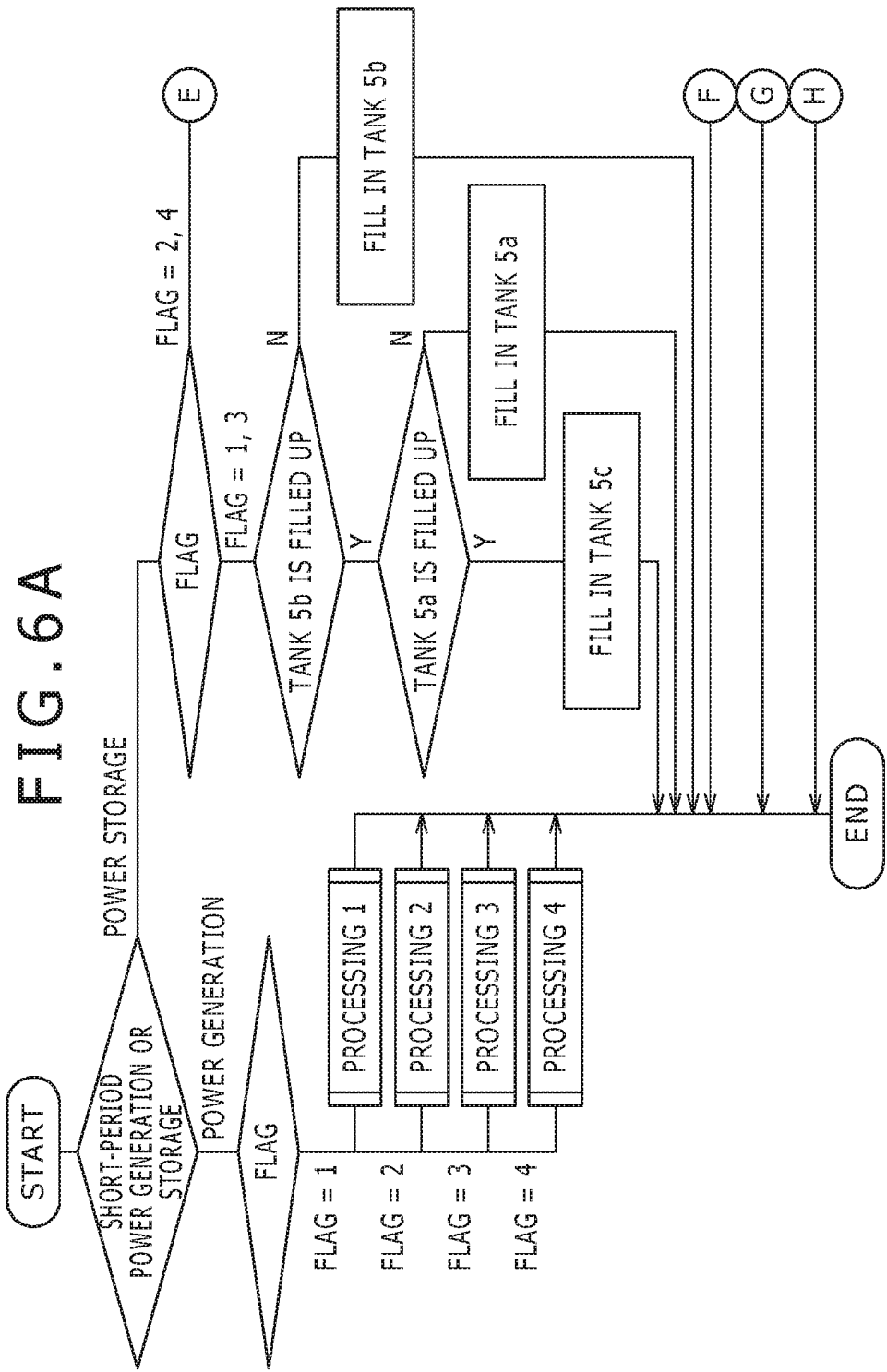

COMPRESSED AIR STORAGE AND POWER GENERATION DEVICE AND COMPRESSED AIR STORAGE AND POWER GENERATION METHOD

TECHNICAL FIELD

The present invention relates to a compressed air energy storage power generation device and a compressed air energy storage power generation method.

BACKGROUND ART

Power generation using natural energy, such as wind-power generation and solar power generation, is affected by weather conditions and sometimes results in unstable outputs. Thus, there is a need to level out outputs by using an energy storage system such as a CAES (compressed air energy storage) system.

A conventional CAES (compressed air energy storage) power generation device generally stores electric energy as compressed air during off-peak hours at a power plant and generates electric energy during high power demand hours by driving an expander using the compressed air and operating a generator.

Such a CAES power generation device using natural energy is disclosed, for example, in Patent Document 1 and Patent Document 2.

Patent Document 1 discloses a CAES power generation device using wind power.

Patent Document 2 discloses a CAES power generation device using solar light.

Power generation using natural energy causes a long-period and short-period output variations. The terms "long-period" and "short-period" are not clearly defined, however the long-period variation takes place in about several hours to several days. On the other hand, the short-period variation takes place in about several minutes to less than an hour. For example, in power generation using solar light, the long-period output variation is caused by a difference between the daytime and the night. The short-period output variation is caused when the sun temporarily disappears behind a cloud. On the other hand, in power generation using wind power, the long-period output variation is caused when power generation is stopped by strong wind or a windless condition, while the short-period output variation is caused by fluctuations in wind velocity.

The conventional CAES power generation devices using natural energy, including the ones disclosed in Patent Document 1 and Patent Document 2, comprise a compressed air storage tank having a large capacity, and store compressed air when power demand is low and generate power by the stored compressed air when power demand is high. However, the tank having a large capacity takes a long time, in starting, to be pressurized to a level suitable for generating power after the compression is started, and is thus not suitable for leveling out the short-period output variation.

CITATION LIST

Patent Document

Patent Document 1: JP 2005-530074 T
Patent Document 2: JP 7-317649 A

SUMMARY OF THE INVENTION

Technical Problem

An object of the present invention is to provide a CAES power generation device capable of coping with both a long-period and short-period power variations.

Solution to Problem

In a preferable embodiment of the present invention, a compressed air energy storage power generation device comprises: a plurality of motors driven by power generated using natural energy, the motors being connected electrically in parallel to each other; a plurality of compressors for compressing air, mechanically connected to the motors; at least two tanks of different capacities for storing the air compressed by the compressors; a plurality of expanders driven by the compressed air supplied from the tanks; a plurality of generators mechanically connected to the expanders, the generators being connected electrically in parallel to each other; and a control means performing control for leveling out both a long-period and short-period power variations caused in power generated by the natural energy by using the tank having a relatively large capacity to cope with the long-period power variation and using the tank having a relatively small capacity to cope with the short-period power variation, thereby outputting power according to power demand.

The compressed air energy storage power generation device uses the tanks of different capacities depending on the long-period and short-period power variations. This makes it possible to level out both the long-period and the short-period power variations and output power according to power demand. In particular, the short-period power variation can be leveled out with excellent followability. The term "excellent followability" herein means that target output is achieved with little time delay.

Another preferable embodiments of the present invention are explained one at a time below. Of the at least two tanks of different capacities, the tank having a relatively small capacity preferably has a capacity to generate power continuously for less than an hour. Further, the tank having a relatively large capacity preferably has a capacity to generate power continuously for one hour or more.

The compressed air energy storage power generation device separately uses the tanks having large and small capacities to achieve an appropriate capacity according to the long-period and short-period power variations. Thus, using unnecessarily large tank or emptying a tank due to high demand can be prevented. Further, the small capacity tank can be pressurized to a level suitable for generating power in a short time and easily maintained at a high pressure at all times, thereby exhibiting excellent responsiveness particularly to the short-period variation.

The control means preferably performs control in accordance with power demand by leveling out the long-period and short-period power variations based on a long-period demand curve and a short-period standard curve, respectively.

In the compressed air energy storage power generation device, target curves for leveling out the long-period and short-period power variations are set individually. This makes it possible to level out both the long-period and short-period power variations and efficiently perform control in accordance with power demand. This allows for further efficient control along with the configuration that includes separately the large capacity tank for the long-period variation and the small capacity tank for the short-period variation.

Further, both the compressor and the generator, connected to the tank having a relatively small capacity, are preferably a screw type. Also, both the compressor and the expander, connected to the tank having a relatively large capacity, are preferably a screw type.

The compressed air energy storage power generation device adopts the screw-type compressor and generator, instead of a turbo-type, making it possible to perform rotating speed control. Further, as compared to the turbo type, the screw type can be operated at a small flow rate (low rotating speed) without lowering efficiency, thus a control range can be extended.

Further, at least one of the compressor and the expander, connected to the tank having a relatively large capacity, may be the turbo type and both the compressor and the expander, connected to the tank having a relatively small capacity, may be the screw type.

The compressed air energy storage power generation device can be built by additionally installing the screw-type compressor and expander having small capacities to an existing CAES facility. Although the existing CAES facility commonly adopts the turbo type, such existing facility can be used as it is. Further, even when the device is newly built, the compressor and expander to be connected to the tank having a large capacity can be the turbo-type since they are primarily intended to be used for coping with the long-period variation.

It is preferable that at least the compressor and the expander having small capacities are used for coping with the short-period power variation and at least the compressor and the expander having large capacities are used for coping with the long-period power variation.

The compressed air energy storage power generation device uses the compressor and the expander having small capacities, which have better responsiveness to input, thus the followability to the short-period variation is improved. Coping with the long-period variation does not require the followability with high accuracy as compared to coping with the short-period variation, thus the compressor and the generator having large capacities can be used according to the capacity of the tank. Further, in general, the compressor and the generator having large capacities exhibit higher efficiency and are thus suitable for coping with the long-period variation.

The compressed air energy storage power generation device preferably comprises an inlet-side heat exchanger, at an inlet of the tank, for heat-exchanging between air whose temperature is raised by compression by the compressor and a heating medium, a heat storage portion for storing the heating medium heat-exchanged by the inlet-side heat exchanger, and an outlet-side heat exchanger, at an outlet of the tank, for heat-exchanging between the air discharged from the tank and the heating medium discharged from the heat storage portion, thereby heating the air.

The compressed air energy storage power generation device recovers heat generated in the compressor and returns it to the air right before expansion, thereby enabling to improve charge and discharge efficiency. In a conventional CAES system, heat generated in a compressor is supplied into a tank together with compressed air. In this step, heat is released to the atmosphere from the tank to cause energy loss. In order to prevent this, the heat is recovered in advance before the compressed air is supplied to the tank, so that the temperature of the compressed air in the tank is brought near to the atmospheric temperature. In this manner, energy loss caused by heat radiation in the tank can be prevented.

The compressed air energy storage power generation device may comprise an external generator separately from the own generator at an output portion of the own generator for generating power when the power generated using natural energy is extremely unstable or too low.

This compressed air energy storage power generation device comprises a separate power generation system and can thus securely maintain power generation output even when output of the power generation device using the natural energy is unexpectedly unstable due to failure, a prolonged stop, and the like.

As the tank having a relatively large capacity, a tunnel of mines or an underground cavity may be used.

A highly airtight mine tunnel may be used as the tank to significantly reduce installation costs. In general, a major cause of costs in building the CAES facility is often the production of the tank having a large capacity. Thus, costs can be significantly reduced by using the highly airtight mine tunnel or underground cavity as a substitute of the tank having a large capacity. Similar to the case of the tank having a large capacity, the tunnel of closed mines or the underground cavity is used as the tank having a small capacity to effectively reduce costs. This can also effectively utilize the mine tunnel (or closed mine tunnel) that otherwise requires proper maintenance and management for many years.

The control means comprises an injection-side valve for switching the tanks to be supplied with the compressed air from the compressor, a discharge-side valve for switching the expanders to be supplied with the compressed air from the tank, an output sensor for measuring power generation output of the natural energy, a pressure sensor for measuring a pressure inside the tank, and a control device. The control device may open and close the injection-side valve and the discharge-side valve based on measurement values of the output sensor and the pressure sensor.

In another embodiment of the present invention, there is provided a compressed air energy storage power generation method using a compressed air energy storage power generation device that comprises: a plurality of motors driven by power generated using natural energy, the motors being connected electrically in parallel to each other; a plurality of compressors for compressing air, mechanically connected to the motors; at least two tanks of different capacities for storing the air compressed by the compressors; a plurality of expanders driven by the compressed air supplied from the tanks; and a plurality of generators mechanically connected to the expanders, the generators being connected electrically in parallel to each other, the method performing control for leveling out both a long-period and short-period power variations caused in power generated by the natural energy by using the tank having a relatively large capacity to cope with the long-period power variation and using the tank having a relatively small capacity to cope with the short-period power variation, thereby outputting power according to power demand.

Advantageous Effects of Invention

In the present invention, the tanks of different capacities are accordingly used to cope with the long-period and short-period power variations. Thus, the device can effectively level out both the long-period and short-period power variations and output power according to power demand.

BRIEF DESCRIPTION OF DRAWINGS

FIG. 6A is a flowchart depicting a method of controlling a short-period variation using the compressed air energy storage (CAES) power generation device in FIG. 1, the method being different from those in FIG. 4A and FIG. 4B.

DESCRIPTION OF EMBODIMENTS

Hereinafter, embodiments of the present invention will be described with reference to the drawings.

First Embodiment

Figure 1:
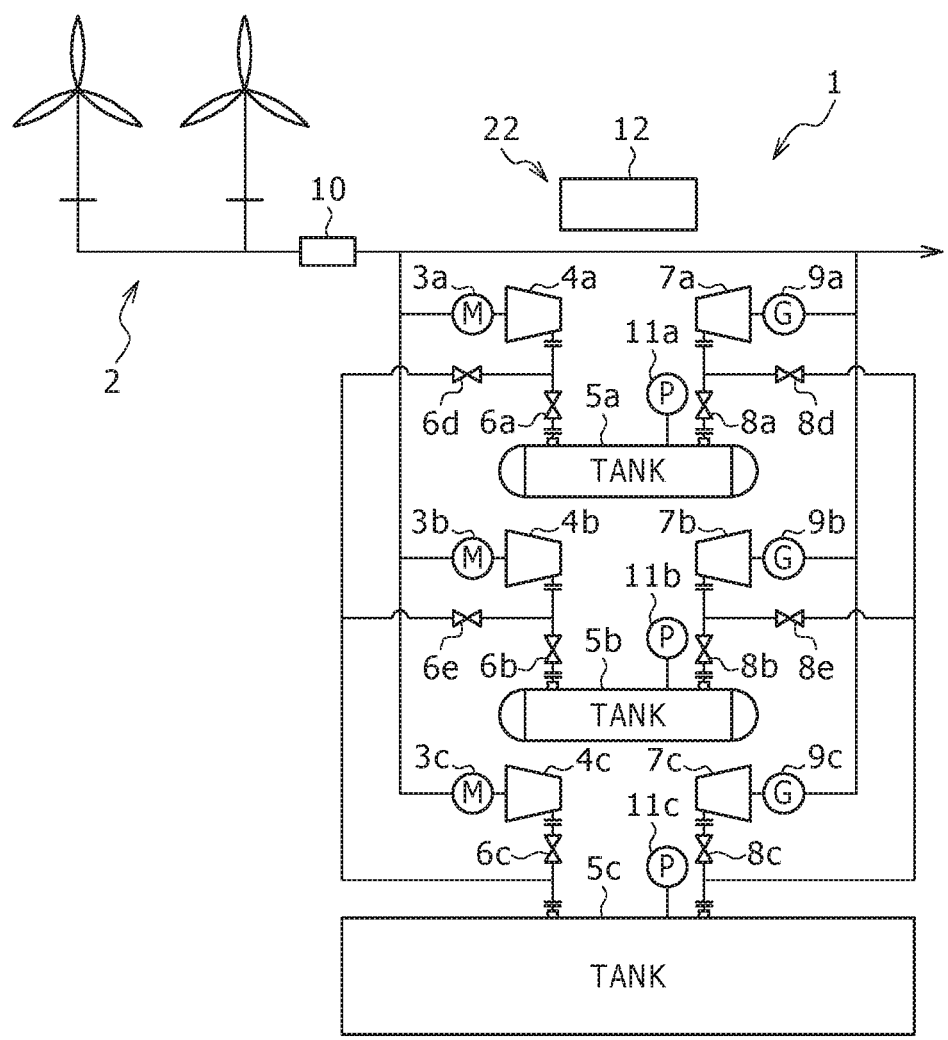
FIG. 1 is a schematic block diagram illustrating a compressed air energy storage (CAES) power generation device of a first embodiment.

FIG. 1 shows a schematic block diagram illustrating a compressed air energy storage (CAES) power generation device 1 of a first embodiment of the present invention. This CAES power generation device 1 is a device for leveling out output variation caused in power generated using natural energy and for outputting power according to fluctuation of power demand.

A configuration of the CAES power generation device 1 is described with reference to FIG. 1.

The CAES power generation device 1 is used for leveling out output variation of a wind-power generation device 2 (in the first embodiment, there are two windmills in the power generation facility). The CAES power generation device 1 comprises motors 3a to 3c, compressors 4a to 4c, compressed air storage tanks 5a to 5c, injection-side valves 6a to 6e, expanders 7a to 7c, discharge-side valves 8a to 8e, generators 9a to 9c, an output sensor 10, pressure sensors 11a to 11c, and a control device 12. A control means 22 comprises the injection-side valves 6a to 6e, the discharge-side valves 8a to 8e, the output sensor 10, the pressure sensors 11a to 11c, and the control device 12.

Power generated by the wind-power generation device 2 is supplied to the motors 3a to 3c connected electrically in parallel to each other. The motors 3a to 3c are driven by this power. The motors 3a to 3c are mechanically connected to the compressors 4a to 4c, respectively. The compressors 4a to 4c are put in operation by driving the motors 3a to 3c. The compressors 4a to 4c compress sucked air and pressure-feed the air to the tanks 5a to 5c. Consequently, energy can be stored as the compressed air in the tanks 5a to 5c.

In the present embodiment, three tanks 5a to 5c are installed. Among them, two tanks 5a and 5b have relatively small capacities (small capacity tanks) and one tank 5c has a relatively large capacity (large capacity tank). The small capacity tanks 5a and 5b have capacities capable of continuously storing air or generating power for about 5 min to 20 min (less than an hour). The large capacity tank 5c has a capacity capable of continuously storing air or generating power for about 1 to 8 hours (more than one hour). In order to cope with power variations caused in power generated using wind power and solar light, a threshold between the small capacity tank and the large capacity tank is preferably set to about one hour. The small capacity tanks 5a and 5b are connected to the motors 3a and 3b and the compressors 4a and 4b, respectively, via air supply passages. The large capacity tank 5c is connected to all the motors 3a to 3c and all the compressors 4a to 4c via air supply passages. In the CAES power generation device 1 according to the present invention, it is only required that at least two of the tanks 5a to 5c, having different capacities, are installed. Thus, the device may have, for example, one or three or more of the small capacity tanks 5a and 5b. The device may have two or more large capacity tanks 5c. That is, regarding the number of the small capacity tanks 5a and 5b and the large capacity tanks 5c, it is only required that at least one tank from each category is installed, otherwise their unit number is not particularly limited. This also applies to second to fifth embodiments described below. Further there is no clear distinction between the small capacity tank and the large capacity tank in terms of capacity, and a difference in capacity between the small capacity tank and the large capacity tank may be based on a relative difference. Further the small capacity tanks 5a and 5b are not necessary to have the same capacity, and the capacity of the tank 5a may be made smaller than the tank 5b when the tank 5a is preferentially controlled, as described below.

As the large capacity tank 5c, an underground cavity, such as a cavity of rock-salt bed, a tunnel of closed mines, and a sewer pipe and a vertical hole, and a bag-shaped container immersed in water may be used. A highly airtight mine tunnel can be used as the tanks 5a to 5c to significantly reduce installation costs. In general, a major cause of increasing costs in building the CAES facility is often the production of the tank 5c having a large capacity. Thus, installation costs can be significantly reduced by using the highly airtight mine tunnel as a substitute of the tank 5c having a large capacity. Similar to the case of the tank 5c having a large capacity, the tunnel of closed mines is used as the tanks 5a and 5b having small capacities to effectively reduce costs. It is also expected that this can effectively utilize the mine tunnel (or closed mine tunnel) that otherwise requires maintenance costs for proper maintenance and management for many years.

The injection-side valves 6a to 6e are provided at the air supply passages between the compressors 4a to 4c and the tanks 5a and 5c. The injection-side valves 6a to 6e are used to select which of the tanks 5a to 5c is supplied with compressed air from the compressors 4a to 4c.

The small capacity tanks 5a and 5b are connected to the expanders 7a and 7b and the generators 9a and 9b, respectively, via air supply passages. The large capacity tank 5c is connected to all the expanders 7a to 7c and all the generators 9a to 9c via air supply passages.

The compressed air stored in the tanks 5a to 5c is supplied to the expanders 7a to 7c. The expanders 7a to 7c are driven by the compressed air. The discharge-side valves 8a to 8e are provided at the air supply passages between the tanks 5a to 5c and the expanders 7a and 7c. The discharge-side valves 8a to 8e are used to select which of the expanders 7a to 7c is supplied with the compressed air from the tanks 5a to 5c. The expanders 7a to 7c are connected electrically in parallel to each other and mechanically connected to the generators 9a to 9c, respectively. The generators 9a to 9c are put in operation by driving the expanders 7a to 7c and generate power.

The output sensor 10 measures output of the wind-power generation device 2. The output sensor 10 may measure power and the like at an input portion of the CAES power generation device 1 or receive an output signal from the wind-power generation device 2. The pressure sensors 11a to 11c measure pressures inside the tanks 5a to 5c, respectively. The control device 12 is electrically connected to the injection-side valves 6a to 6e and the discharge-side valves 8a to 8e. The control device 12 controls opening and closing of the injection-side valves 6a to 6e and the discharge-side valves 8a to 8e based on measured values of the output sensor 10 and the pressure sensors 11a to 11c.

It is noted that an electric power device such as a transformer, an inverter, a relay, and a breaker (not shown) are arranged between the wind-power generation device 2 and the motors 3a to 3c, and between a system and the generators 9a to 9c. The pressure sensors 11a to 11c are used in this embodiment, however any detector capable of detecting amounts of remaining air inside the tanks may be used other than the pressure sensors.

Further, in the present first embodiment, capacities of the compressors 4a to 4c and the expanders 7a to 7c in use may be identical or changed in the order of compressor 4c>compressor 4b>compressor 4a and in the order of expander 7c>expander 7b>expander 7a, respectively. In general, responsiveness of the compressor and the expander increases as their capacity becomes smaller, while efficiency of the compressor and the expander increases as their capacity becomes larger. In order to make use of these advantageous points, the compressor and the expander having relatively small capacities are preferably used to cope with the short-period variation, while the compressor and the expander having relatively large capacities are preferably used to cope with the long-period variation.

As described above, the CAES power generation device 1 utilizes energy stored in compressed air. Thus, the device is effective in not discharging a toxic substance into the environment. Further, the device does not use a secondary battery or a capacitor for storing energy. Using a secondary battery or a capacitor is disadvantageous with the following reasons. A secondary battery requires a high disposal cost and has a short cycle life (the number of charging and discharging cycles). Certain types of secondary battery require monitoring of charging rate and voltage, and temperature control. A capacitor has low energy density and is expensive.

Next, a leveling method of the CAES power generation device 1 and a control method thereof are described in detail.

Figure 2:
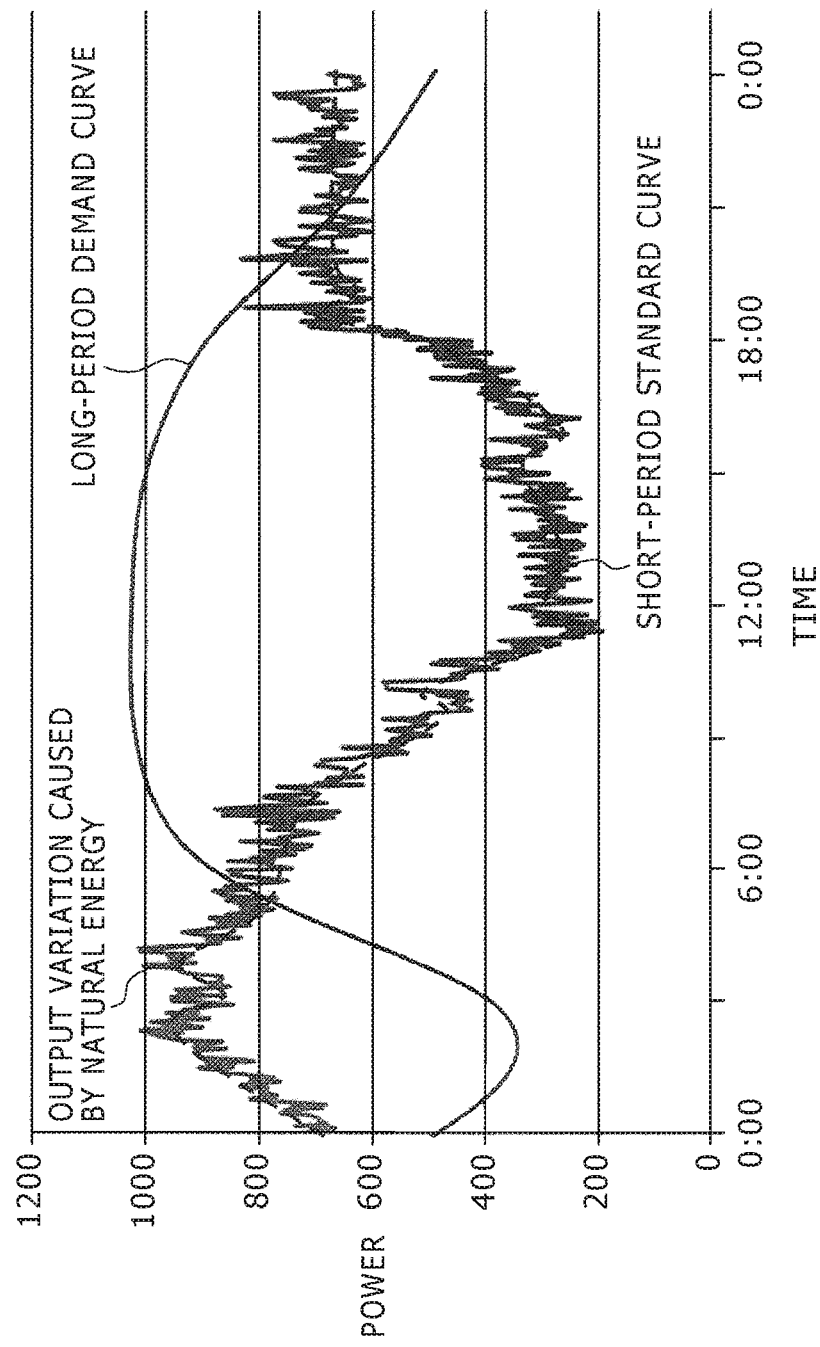
FIG. 2 is a one-day trend of power (output variation caused by natural energy) generated by a wind-power generation device in FIG. 1 and target curves for leveling out short-period and long-period power variations.

FIG. 2 shows an example of one-day trend of output variation of the wind-power generation device 2 (output variation caused by natural energy), and two leveling target curves (long-period demand curve and short-period standard curve). The output variation of the wind-power generation device 2 is measured by the output sensor 10, and recognized by the control device 12 while being classified into the long-period variation and the short-period variation. The term "long-period" herein refers to variation at intervals of several hours, while the term "short-period" refers to variation at intervals of several minutes. Variation at intervals of several seconds is removed by a filter and the like. The short-period variation is leveled out mainly by using the small capacity tanks 5a and 5b. The long-period variation is leveled out mainly by using the large capacity tank 5c to output power according to the demand curve. Power generation using the small capacity tanks 5a and 5b has excellent responsiveness as compared to the large capacity tank 5c, since the small capacity tanks 5a and 5b can be pressurized to a level suitable for generating power in a short time and constantly maintained in a state of storing an appropriate amount of compressed air for generating power. Thus, by using the tanks 5a to 5c of different capacities according to the length of a variation period, the short-period variation in particular can be leveled out with excellent followability.

Of the short-period variation and the long-period variation, a method of controlling the long-period variation is first described.

Figure 3:
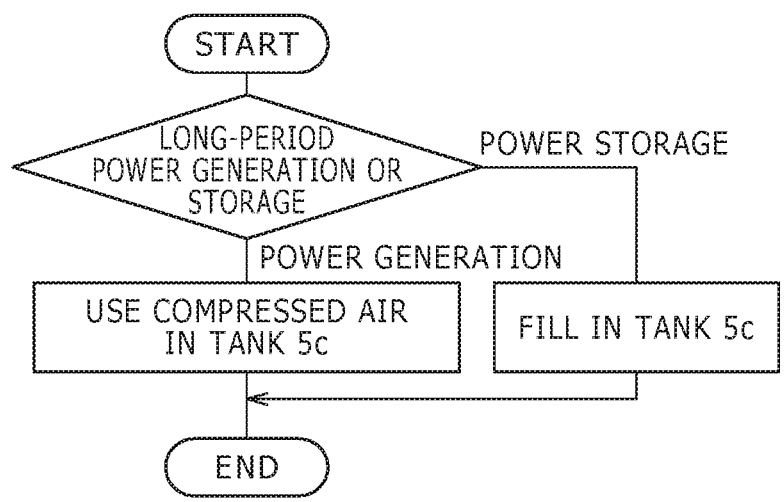
FIG. 3 is a flowchart depicting a method of controlling a long-period variation using the compressed air energy storage (CAES) power generation device in FIG. 1.

FIG. 3 is a flowchart depicting a method of controlling the long-period variation. As shown in FIG. 3, both power generation and storage are performed while coping with the long-period variation. When power is generated while coping with the long-period variation, the compressed air in the large capacity tank 5c is used to drive the expander 7c and generate power. During this process, the discharge-side valve 8c is opened. When power is stored while coping with the long-period variation, the compressed air is filled in the large capacity tank 5c using the compressor 4c. During this process, the injection-side valve 6c is opened. In this case, it is not necessary to use the compressors 4a and 4b, however, the compressors 4a and 4b may be used for rapidly filling. Similarly, it is not necessary to use the expanders 7a and 7b, however, the expanders 7a and 7b may be used when necessary to increase discharge power.

The control device 12 switches between power generation and storage and controls a rotational speed of the compressor and the expander. The switching decision is made based on the long-period demand curve in FIG. 2. When output of the wind-power generation device 2 (a measurement value of the output sensor 10) is positioned on or above the long-period demand curve, power storage is performed. On the other hand, when it is positioned below the long-period demand curve, power generation is performed. In this manner, the control device 12 performs control so as to bring the output of the output sensor 10 close to the long-period demand curve that has been set as a target. The long-period demand curve described herein is determined, for example, by the day of the week, the weather condition, and the like, of the current day based on the past power consumption data that have been accumulated over the years.

Next, a method of controlling the short-period variation is described.

Figure 4A:
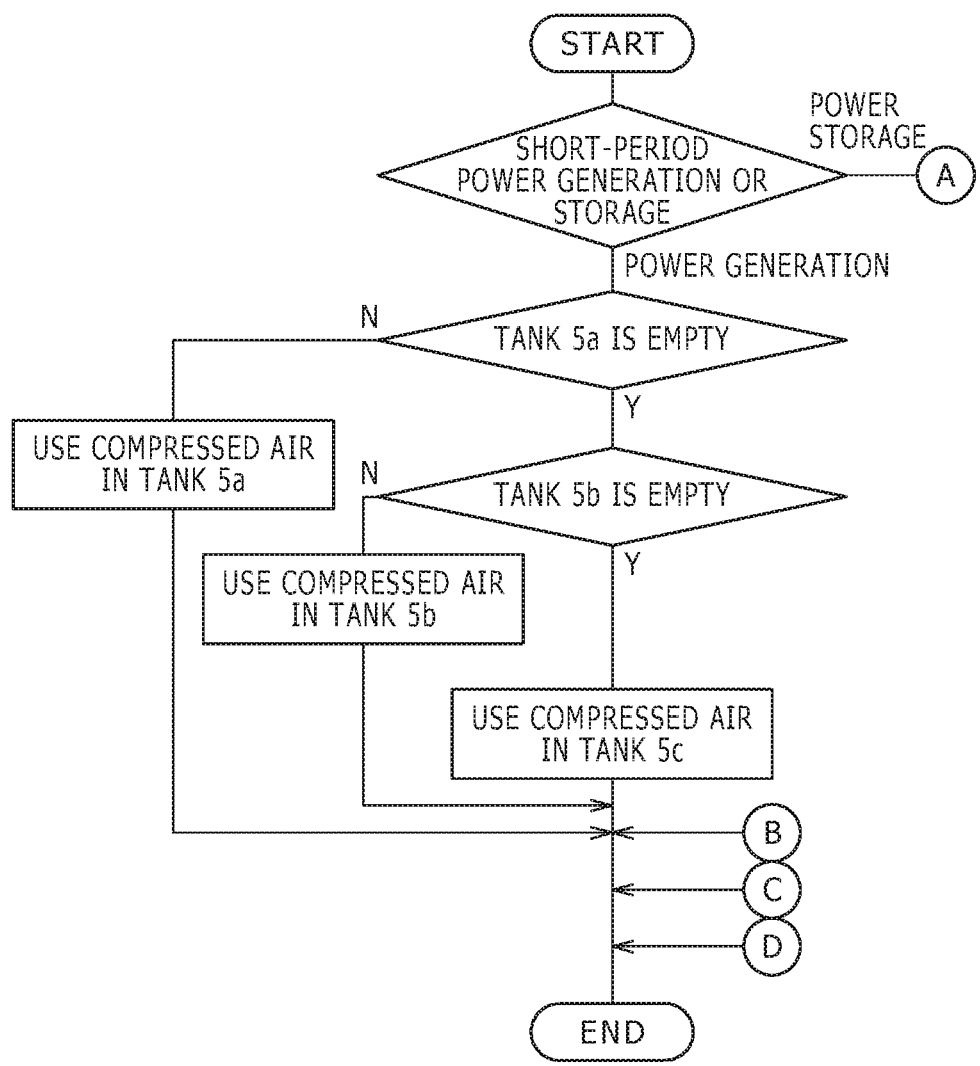
FIG. 4A is a flowchart depicting a method of controlling a short-period variation using the compressed air energy storage (CAES) power generation device in FIG. 1.
Figure 4B:
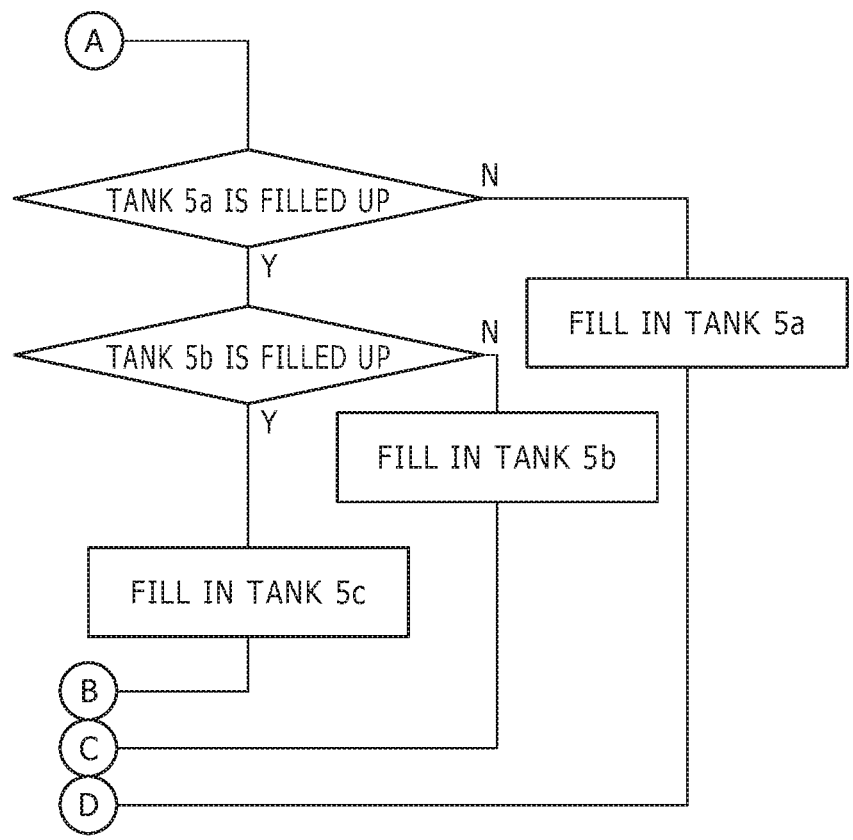
FIG. 4B is a flowchart depicting a method of controlling a short-period variation using the compressed air energy storage (CAES) power generation device in FIG. 1.

FIG. 4A and FIG. 4B show flowcharts depicting methods of controlling the short-period variation. As in the case of the long-period variation, both power generation and storage are performed while coping with the shot-period variation. When power is generated while coping with the short-period variation, for example, the compressed air in the small capacity tank 5a is used to rotate the expander 7a and generate power. During this process, the discharge-side valve 8a is opened and the discharge-side valve 8d is closed. When power is stored while coping with the short-period variation, for example, the compressed air is filled in the small capacity tank 5a using the compressor 4a. During this process, the injection-side valve 6a is opened and the injection-side valve 6d is closed.

As in the case of the long-period variation, the control device 12 also switches between power generation and storage to cope with the short-period variation. The switching decision is made based on the short-period standard curve indicated by a dashed line in FIG. 2. When the output of the wind-power generation device 2 (the measurement value of the output sensor 10) is positioned on or above the short-period standard curve, power storage is performed. On the other hand, when it is positioned below the short-period standard curve, power generation is performed. In this manner, the control device 12 performs a leveling operation so as to bring the output of the wind-power generation device 2 (the measurement value of the output sensor 10) close to the short-period standard curve that has been set as a target. The short-period standard curve described herein is determined, for example, based on an average value at the latest predetermined time point.

The compressors 4a to 4c and the expanders 7a and 7c are generally classified into two types, a turbo type and a displacement type represented by a screw type, a scroll type, and a rotary type. Both the compressors 4a and 4b and the expanders 7a and 7b, connected to the small capacity tanks 5a and 5b, are preferably the displacement type. Also, both the compressor 4c and the expander 7c, connected to the large capacity tank 5c, are preferably the displacement type. In such a configuration, the displacement type is adopted instead of the turbo type, making it possible to perform rotational speed control and maintain stable power generation. Further, as compared to the turbo type, the displacement type can be operated at a small flow rate (low rotating speed) without lowering efficiency, thus making it possible to maintain stable power generation even when an amount of the compressed air stored in the tank is small. As a result, a control range can be extended. In particular, the compressors 4a and 4b and the expanders 7a and 7b, connected to the small capacity tanks 5a and 5b, require excellent followability to level out the short-period variation, and become particularly effective by adopting the displacement type. It is noted that the compressors 4a to 4c and the expanders 7a and 7c used in the present embodiment adopt the screw type (more specifically, twin screw type), which is suitable for a relatively large capacity device among other displacement types.

Besides the configuration described above, both the compressor 4c and the expander 7c, connected to the large capacity tank 5c, may be the turbo type, while the compressors 4a and 4b and the expanders 7a and 7b, connected to the small capacity tanks 5a and 5b, may be the displacement type. In this configuration, the displacement-type compressors 4a and 4b, the displacement-type expanders 7a and 7b, and the tanks 5a and 5b, all having small capacities, can be additionally installed to an existing CAES facility (tank 5c, compressor 4c, and expander 7c). This configuration takes advantage of the fact that the existing CAES facility commonly adopts the turbo type and can be used as it is. Further, even when the device is newly built, the compressor 4c and the expander 7c, connected to the large capacity tank 5c, can adopt the turbo type since they are primarily intended to be used for coping with the long-period variation.

It is preferable that the compressors 4a and 4b and the expanders 7a and 7b, having small capacities, are used for coping with the short-period power variation and the compressor 4c and the expander 7c, having large capacities, are used for coping with the long-period power variation. Having such a configuration improves the followability to the short-period variation since the compressors 4a and 4b and the expanders 7a and 7b, having small capacities, exhibit better responsiveness to input.

When the short-period variation is leveled out, the control device 12 performs unit number control and rotational speed control of the compressors 4a and 4b and the expanders 7a and 7b based on amplitude of the short-period power variation that is measure using the output sensor 10. It is noted that the compressors 4a and 4b and the expanders 7a and 7b need to be the displacement type for performing the rotational speed control. For example, regarding the unit number control, the compressor 4a and the expander 7a, connected to the small capacity tank 5a, are primarily used. However, when the amplitude of the power variation is largely deviated from the short-period standard curve to the extent that the compressor 4a and the expander 7a cannot level out any more, the operating numbers of the compressors and expanders are increased (the compressor 4b or the expander 7b is additionally used). During this process, the injection-side valves 6a to 6e and the discharge-side valves 8a to 8e are controlled in accordance with the operation of the compressors 4a to 4c and the expanders 7a to 7c. When it is necessary to cope with particularly volatile fluctuation, all the compressors 4a to 4c or all the expanders 7a to 7c may be simultaneously put in operation. In this manner, the variation can be leveled out in a wider range. Similarly, the rotation speed control is performed by increasing or decreasing the rotation speed (output) of the compressors 4a to 4c and the expanders 7a to 7c according to a degree of variation to be leveled out in order to achieve optimized leveling.

In the present embodiment, two small capacity tanks 5a and 5b are installed. Thus, furthermore, the control device 12 determines which of the small capacity tanks 5a and 5b is used based on measurement values of the pressure sensors 11a to 11c. FIG. 4A and FIG. 4B show control in a particular case where the small capacity tank 5a is set as a main tank 5a.

By referring to FIG. 4A and FIG. 4B, when power generation is performed while coping with the short-period variation, the small capacity tank 5a is used (the discharge-side valve 8a is opened and the discharge-side valve 8d is closed) as long as the small capacity tank 5a has a sufficient filling amount suitable for power generation. When the small capacity tank 5a is empty or has a low filling amount and the small capacity tank 5b has a sufficient filling amount, the small capacity tank 5b is used (the discharge-side valve 8b is opened and the discharge-side valve 8e is closed). When both the small capacity tanks 5a and 5b are empty or have low filling amounts and the large capacity tank has a sufficient filling amount, the large capacity tank 5c is unavoidably used (any of the discharge-side valves 8c to e is opened and other discharge-side valves are closed).

Figure 5:
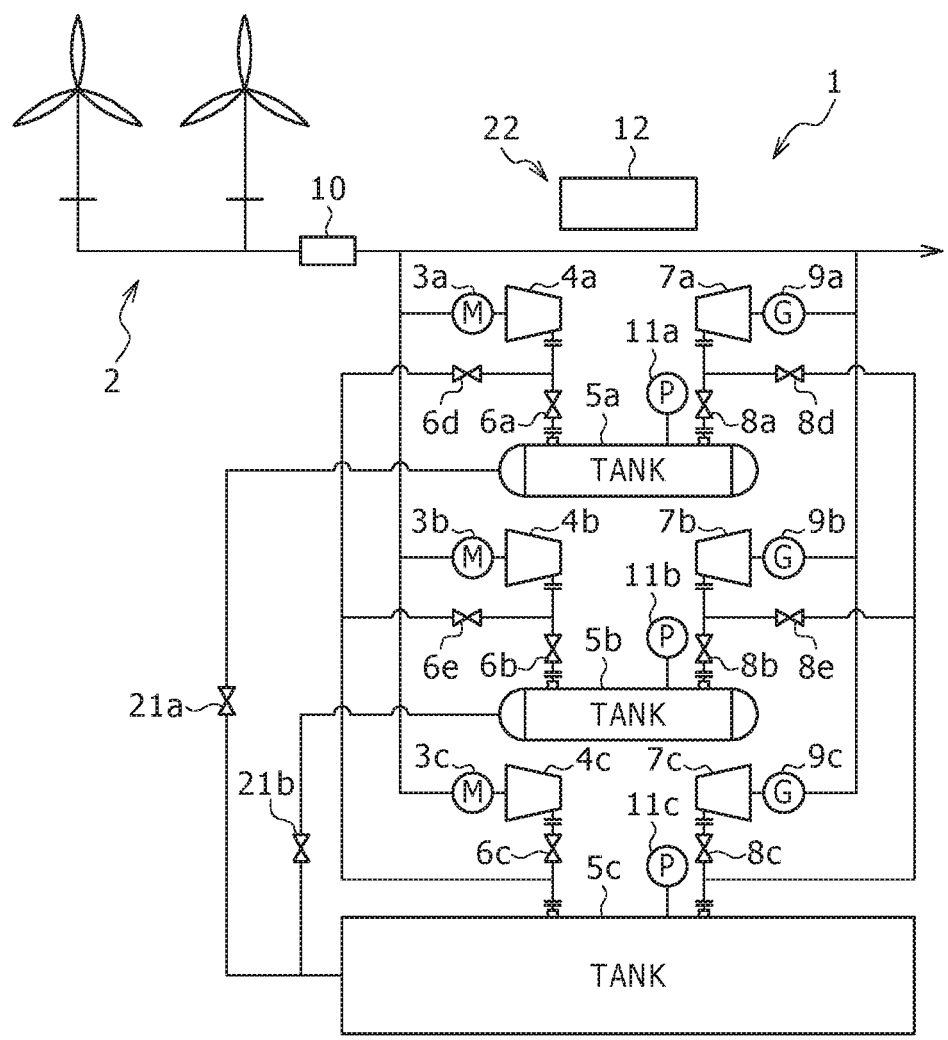
FIG. 5 is a schematic block diagram illustrating a variation of the compressed air energy storage (CAES) power generation device of the first embodiment.
Figure 6B:
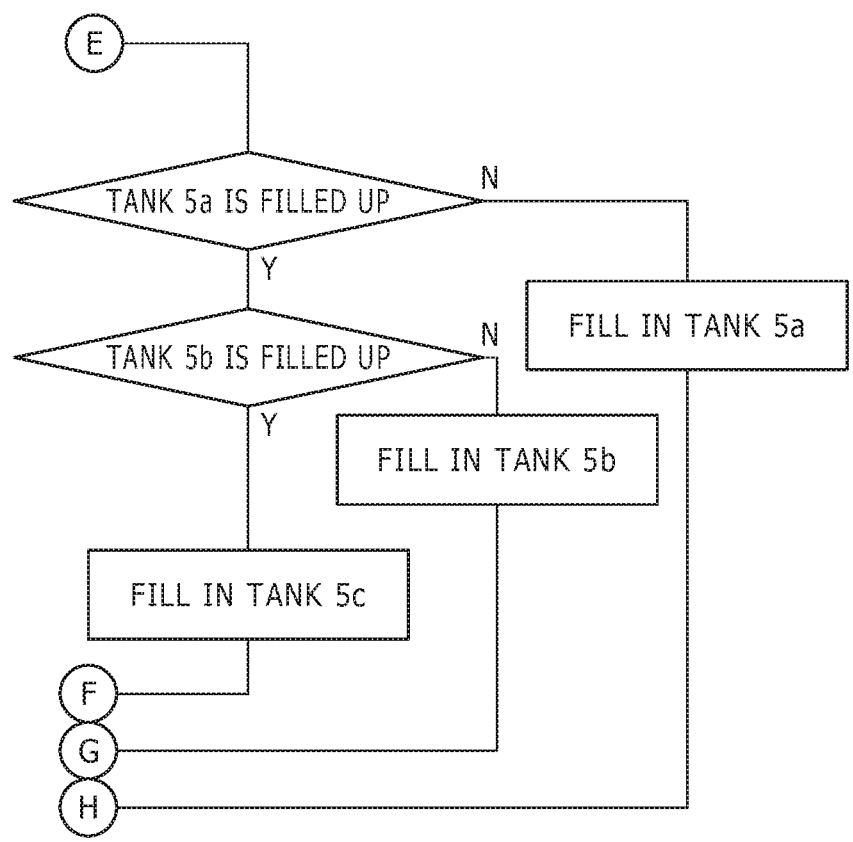
FIG. 6B is a flowchart depicting a method of controlling a short-period variation using the compressed air energy storage (CAES) power generation device in FIG. 1, the method being different from those in FIG. 4A and FIG. 4B.
Figure 7A:
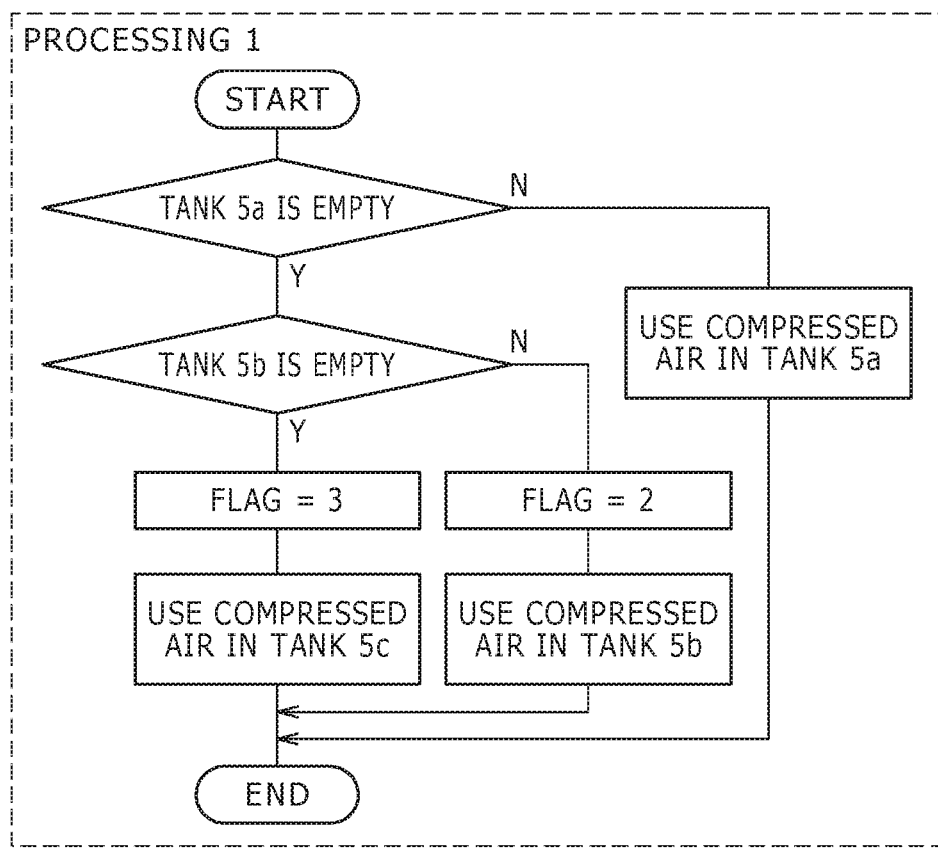
FIG. 7A is a sub-flowchart of a processing 1 in FIG. 6A.
Figure 7B:
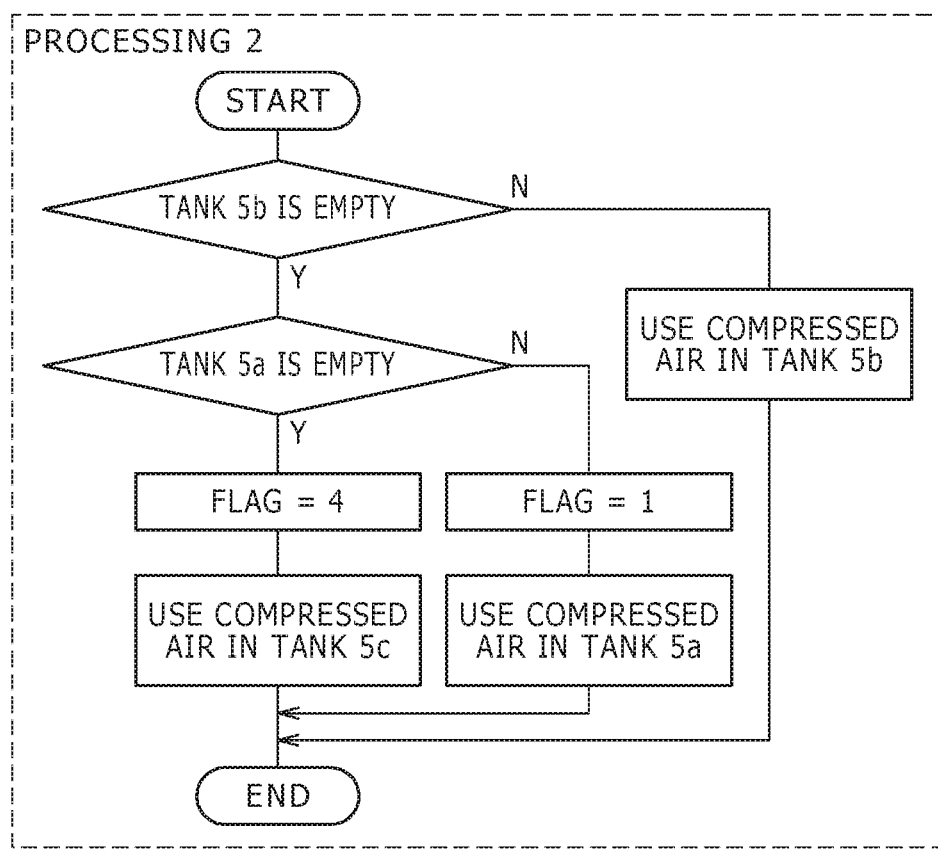
FIG. 7B is a sub-flowchart of a processing 2 in FIG. 6A.
Figure 7C:
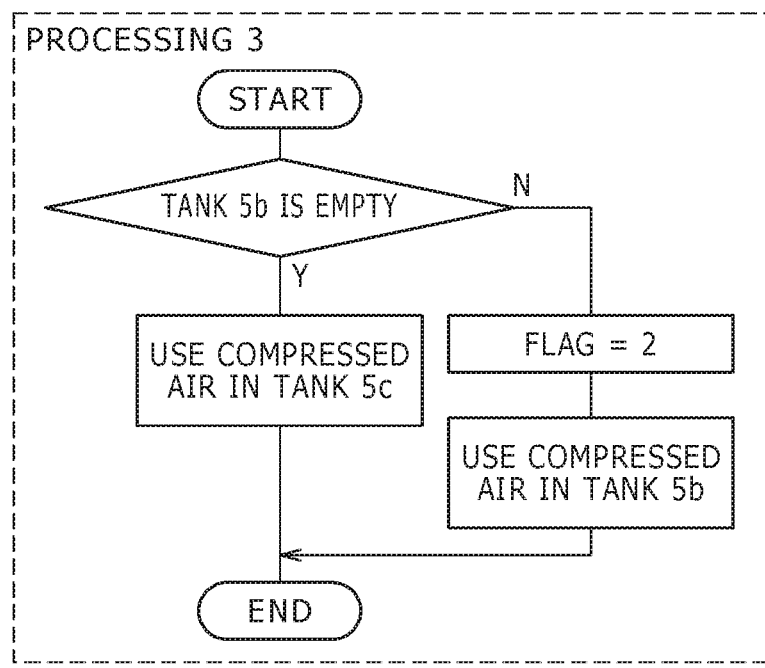
FIG. 7C is a sub-flowchart of a processing 3 in FIG. 6A.
Figure 7D:
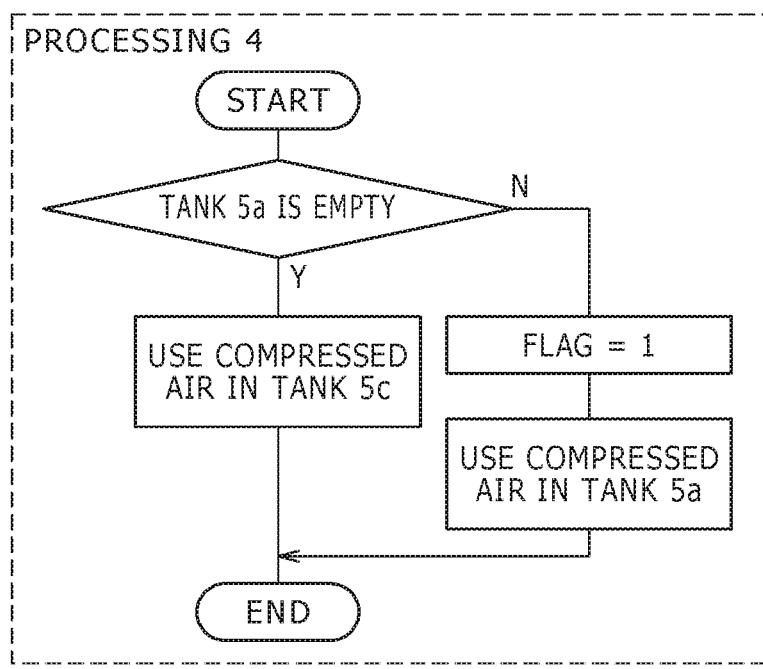
FIG. 7D is a sub-flowchart of a processing 4 in FIG. 6A.

It is noted that when the small capacity tank 5a or 5b has a small amount of air, compressed air may be appropriately filled into the small capacity tank 5a or 5b from the large capacity tank 5c using differential pressure. FIG. 5 describes this process. The large capacity tank 5c is connected to the small capacity tanks 5a and 5b via tank-interconnecting air supply valves 21a and 21b, allowing for supply of compressed air. As the tank-interconnecting air supply valves 21a and 21b, a solenoid valve that is controlled to open and close based on a pressure difference between the small capacity tank and the large capacity tank and a differential pressure control valve that is automatically opened and closed by a pressure difference can be used. In this manner, the device can be configured to transfer air from the large capacity tank 5c to the small capacity tanks 5a and 5b by differential pressure filling. The same configuration is also applied to second to fifth embodiments described below.

When power storage is performed while coping with the short-period variation, compressed air is filled into the small capacity tank 5a unless the small capacity tank 5a is filled up (the injection-side valve 6a is opened and the injection-side valve 6d is closed). When the small capacity tank 5a is filled up, but the small capacity tank 5b is not filled up, the compressed air is filled into the small capacity tank 5b (the injection-side valve 6b is opened and the injection-side valve 6e is closed). When both the small capacity tanks 5a and 5b are filled up, the compressed air is filled into the large capacity tank 5c (the injection-side valve 6c is opened).

In this manner, even if both the small capacity tanks 5a and 5b become empty, the expanders 7a and 7b can be driven using the compressed air in the large capacity tank 5c. This can avoid a failure in leveling out the short-period variation.

Alternatively, the method does not have to designate the main tank having a high priority among the small capacity tanks. FIGS. 6A and 6B and FIGS. 7A to 7D show control methods in which the small capacity tanks 5a and 5b are alternately used.

When power generation is performed while coping with the short-period variation, processings 1 to 4 are selected based on a flag stored in the control device 12. In the processing 1, the small capacity tank 5a is used (the discharge-side valve 8a is opened and the discharge-side valve 8d is closed) unless the small capacity tank 5a is empty (or has a small amount of compressed air, the same applies hereinafter). When the small capacity tank 5a is empty and the small capacity tank 5b is not empty, the flag is changed to flag=2 to start using the small capacity tank 5b (the discharge-side valve 8b is opened and the discharge-side valve 8e is closed). When both the small capacity tanks 5a and 5b are empty, the flag is changed to flag=3 to use the large capacity tank 5c (either of the discharge-side valve 8d or 8e is opened and other discharge-side valves are closed). In the processing 2, the small capacity tank 5b is used (the discharge-side valve 8b is opened and the discharge-side valve 8e is closed) unless the small capacity tank 5b is empty. When the small capacity tank 5b is empty and the small capacity tank 5a is not empty, the flag is changed to flag=1 to start using the small capacity tank 5a (the discharge-side valve 8a is opened and the discharge-side valve 8d is closed). When both the small capacity tanks 5b and 5a are empty, the flag is changed to flag=4 to use the large capacity tank 5c (either of the discharge-side valve 8d or 8e is opened and other discharge-side valves are closed, however, the discharge-side valve 8c is kept open for allowing the expander 7c to continuously control the long-period variation). In the processing 3, when the small capacity tank 5b is not empty, the flag is changed to flag=2 to use the small capacity tank 5b (the discharge-side valve 8b is opened and the discharge-side valve 8e is closed). When the small capacity tank 5b is empty, the large capacity tank 5c is used (the discharge-side valves 8a and 8b are closed and the discharge-side valve 8d and/or 8e is opened). In the processing 4, when the small capacity tank 5a is not empty, the flag is changed to flag=1 to use the small capacity tank 5a (the discharge-side valve 8a is opened and the discharge-side valve 8d is closed). When the small capacity tank 5a is empty, the large capacity tank 5c is used (the discharge-side valves 8a and 8b are closed and the discharge-side valve 8d and/or 8e is opened).

When power storage is performed while coping with the short-period variation, the flag stored in the control device 12 selects the tanks 5a to 5c to be filled with compressed air. When the flag is flag=1 or flag=3, the compressed air is filled into the small capacity tank 5b unless it is filled up (the injection-side valve 6b is opened and other valves are closed). When the small capacity tank 5b is filled up, but the small capacity tank 5a is not filled up, the compressed air is filled into the small capacity tank 5a (the injection-side valve 6a is opened and other valves are closed). When both the small capacity tanks 5b and 5a are filled up, the compressed air is filled into the large capacity tank 5c (either of the injection-side valve 6d or 6e is opened and other valves are closed). When the flag is flag=2 or flag=4, the compressed air is filled into the small capacity tank 5a unless it is filled up (the injection-side valve 6a is opened and other valves are closed). When the small capacity tank 5a is filled up, but the small capacity tank 5b is not filled up, the compressed air is filled into the small capacity tank 5b (the injection-side valve 6b is opened and other valves are closed). When both the small capacity tanks 5a and 5b are filled up, the compressed air is filled into the large capacity tank 5c (either of the injection-side valve 6d or 6e is opened and other valves are closed).

In this manner, the small capacity tanks 5a and 5b are alternately used to prevent an increase in the use frequency of either of the tanks. This can prevent one of the small capacity tanks 5a and 5b from being solely deteriorated by use. Further, as in the case where the main tank 5a is designated, even when both the small capacity tanks 5a and 5b are empty, the compressed air in the large capacity tank 5c is used to drive the expanders 7a and 7b. This can avoid a failure in leveling out the short-period variation. It is noted that variations can be leveled out in a wider range by simultaneously using both the small capacity tanks 5a and 5b rather than using them alternately.

Whether the main tank 5a is designated or not, both methods include a safety valve, not shown, so as not exceed a permitted pressure in the tanks 5a to 5c. The safety valve is preset in such a way that the compressed air stored in the tanks 5a to 5c is released to the atmosphere at or under the permitted pressure when the compressed air may exceed the permitted pressure. When all the tanks 5a to 5c are filled up and power of the wind-power generation device 2 needs to be consumed for leveling out the variation, any of the compressors 4a to 4c is driven to release generated air to the atmosphere.

Whether the method includes the designated main tank 5a or not, the small capacity tanks 5a and 5b may not be used until they become completely empty. When amounts of remaining air in the small capacity tanks 5a and 5b become low, amounts of air to be fed into the expanders 7a and 7b are reduced. As a result, it sometimes becomes difficult to secure a sufficient amount of power generation. However, setting a predetermined threshold to the amount of remaining air makes it possible to use the compressed air while maintaining a certain amount or more of air supply (or pressure) that is required for power generation.

According to the present invention, the device uses the tanks of different capacities depending on the long-period and short-period power variations, thus it can efficiently level out both the long-period and the short-period power variations and output power according to power demand. Further, by using the large capacity tank 5c for coping with the short-period power variation as necessary, the leveling can be performed even when both the small capacity tanks 5a and 5b are empty. However, in order to avoid such a situation, it is preferable that air is filled into the small capacity tanks 5a and 5b from the large capacity tank 5c using differential pressure when the amounts of remaining air in the small capacity tanks 5a and 5b become low.

Second Embodiment

Figure 8:
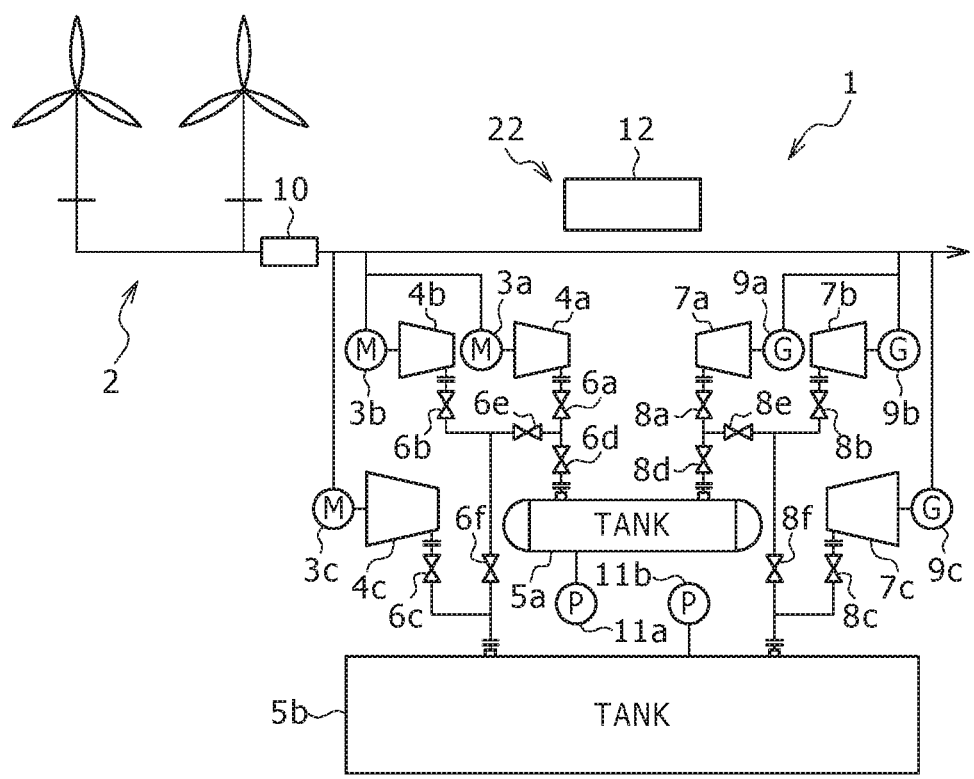
FIG. 8 is a schematic block diagram illustrating a compressed air energy storage (CAES) power generation device of a second embodiment.

FIG. 8 shows a CAES power generation device 1 of a second embodiment. The CAES power generation device 1 of the present embodiment has the same configuration as the first embodiment in FIG. 1 except that single small capacity tank 5a is connected to two (multiple) units of compressors 4a and 4b and expanders 7a and 7b. Thus, parts having the same configuration as shown in FIG. 1 are designated by the same reference numerals and explanations thereof are omitted.

By referring to FIG. 8, the CAES power generation device 1 of the second embodiment comprises single small capacity tank 5a and single large capacity tank 5b. The small capacity tank 5a is connected to motors 3a and 3b, compressors 4a and 4b, expanders 7a and 7b, and generators 9a and 9b. The large capacity tank 5b is connected to all of the following units: motors 3a to 3c, compressors 4a to 4c, expanders 7a to 7c, and generators 9a to 9c. In this configuration, compressed air can be rapidly stored in the small capacity tank 5a, as compared to the case where an individual tank is provided with only one of the motors 3a to 3c, one of the compressors 4a to 4c, one of the expanders 7a to 7c, and one of the generators 9a to 9c. Further, since only one small capacity tank is required, facility costs and installation area can be reduced.

Regarding the leveling method of the CAES power generation device 1 and the control method thereof, the second embodiment is the same as the first embodiment in leveling out the long-period variation to output power according to power demand.

When the short-period variation is leveled out, the control device 12 performs unit number control and rotational speed control of the compressors 4a to 4c and the expanders 7a to 7c based on the short-period standard curve. When power storage is performed by filling compressed air into the small capacity tank 5a, one or two of the compressors 4a and 4b may be used. For example, one compressor 4a is used, the injection-side valves 6a and 6d are opened and at least the injection-side valve 6e is closed. Further, when two compressors 4a and 4b are used, the injection-side valves 6a, 6b, 6d, and 6e are opened and at least the injection-side valve 6f is closed. In this manner, a filling speed and a filling amount of the compressed air into the small capacity tank 5a can be adjusted by controlling the unit number of the compressors 4a and 4b to be used. Similarly, when power generation is performed by using the compressed air in the small capacity tank 5a, one or two of the expanders 7a and 7b may be used. For example, when one expander 7a (generator 9a) is used, the discharge-side valves 8a and 8d are opened and the discharge-side valve 8e and optionally other discharge-side valves are closed. Further, when two expanders 7a and 7b (generators 9a and 9b) are used, the discharge-side valves 8a, 8b, 8d, and 8e are opened and at least the discharge-side valve 8f is closed. In this manner, an amount of power to be generated can be adjusted by controlling the unit number of the expanders 7a and 7b (generators 9a and 9b) to be used. It is noted that, except for the parts described herein, the leveling method of the short-period variation and the control method thereof are the same between the second embodiment and the first embodiment.

Third Embodiment

Figure 9:
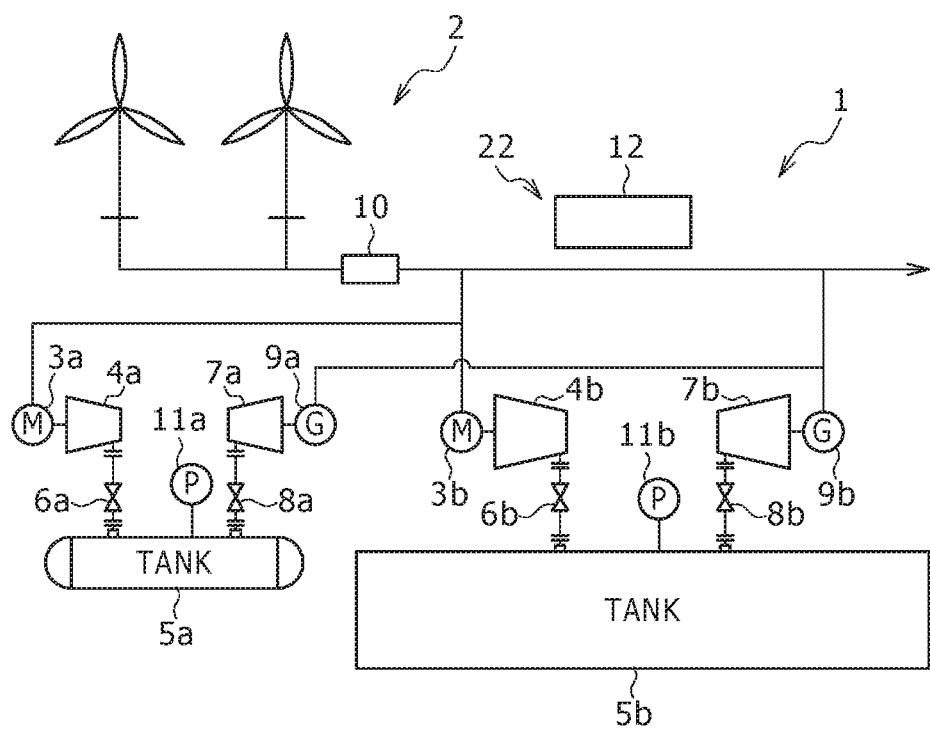
FIG. 9 is a schematic block diagram illustrating a compressed air energy storage (CAES) power generation device of a third embodiment.

FIG. 9 shows a CAES power generation device 1 of a third embodiment. The CAES power generation device 1 of the present embodiment has the same configuration as the first embodiment in FIG. 1 except for parts related to connection constitution of the tanks 5a and 5b with the compressors 4a and 4b and the expanders 7a and 7b. Thus, parts having the same configuration as shown in FIG. 1 are designated by the same reference numerals and explanations thereof are omitted.

The third embodiment is described with reference to FIG. 9. The CAES power generation device 1 of the third embodiment comprises single small capacity tank 5a and single large capacity tank 5b. The tanks 5a and 5b are connected to motors 3a and 3b, compressors 4a and 4b, expanders 7a and 7b, and generators 9a and 9b, respectively. Specifically, the small capacity tank 5a is connected only to the compressor 4a and the expander 7a. The large capacity tank 5b is connected only to the compressor 4b and the expander 7b. That is, the compressor 4a is unable to supply compressed air to the large capacity tank 5b. Further, the large capacity tank 5b is not available for supplying compressed air to the expander 7a. Such a configuration is applicable to a situation in which different air supply passages have different design pressures and a situation in which the tanks 5a and 5b cannot be arranged adjacent to each other (especially when the large capacity tank 5b is an underground cavity, a closed mine tunnel, and the like, thus being located away from the tank 5a).

Regarding the leveling method of the CAES power generation device 1 and the control method thereof, the third embodiment is also the same as the first embodiment in leveling out the long-period variation to output power according to power demand.

When the short-period variation is leveled out, the control device 12 performs unit number control and rotational speed control of the compressors 4a and 4b and the expanders 7a and 7b based on the short-period standard curve. When power storage is performed by filling compressed air into the small capacity tank 5a, compressed air is filled by the compressor 4a (the injection-side valve 6a is opened and other injection-side valves are closed). Further, when power generation is performed by using the compressed air in the small capacity tank 5a, power is generated by the expander 7a and the generator 9a (the discharge-side valve 8a is opened and other discharge-side valves are closed). It is noted that, except for the parts described herein, the leveling method of the short-period variation is the same between the third embodiment and the first embodiment.

Fourth Embodiment

Figure 10:
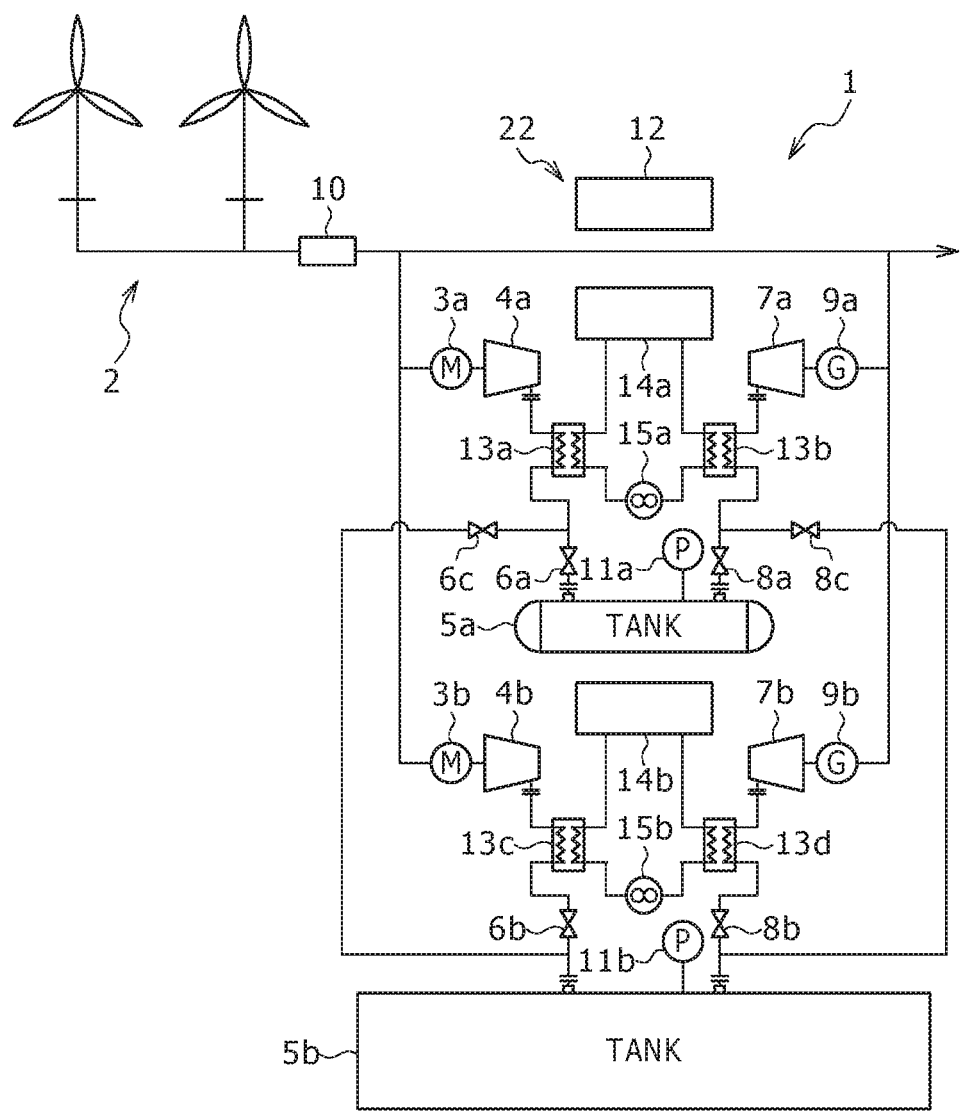
FIG. 10 is a schematic block diagram illustrating a compressed air energy storage (CAES) power generation device of a fourth embodiment.

FIG. 10 shows a CAES power generation device 1 of a fourth embodiment. The CAES power generation device 1 of the present embodiment has the same configuration as the first embodiment in FIG. 1 except for parts related to heat exchangers 13a to 13d and heat storage portions 14a and 14b. Thus, parts having the same configuration as shown in FIG. 1 are designated by the same reference numerals and explanations thereof are omitted.

The fourth embodiment is described with reference to FIG. 10. The CAES power generation device 1 of the fourth embodiment comprises single small capacity tank 5a and single large capacity tank 5b. The tanks 5a and 5b are connected to motors 3a and 3b, compressors 4a and 4b, expanders 7a and 7b, and generators 9a and 9b, respectively. The device further comprises the heat exchangers 13a to 13d and the heat storage portions 14a and 14b connected to the heat exchangers 13a to 13d at inlets and outlets of the tanks 5a and 5b.

Air whose temperature is raised by compression in the compressors 4a and 4b releases heat to the atmosphere while being stored in the tanks 5a and 5b, thereby causing energy loss from s system of the CAES power generation device 1. To prevent this, the air compressed by the compressor 4a is subjected to heat recovery (heat absorption) using a heating medium in an inlet-side heat exchanger 13a before being supplied to the small capacity tank 5a. The heating medium that absorbs the heat by heat exchange in the inlet-side heat exchanger 13a is supplied to the heat storage portion 14a by a pump 15a for storing heat. The heat stored in the heat storage portion 14a is returned, via an outlet-side heat exchanger 13b, to the compressed air that is discharged from the small capacity tank 5a and supplied to the expander 7a. Similarly, the air compressed by the compressor 4b is subjected to heat recovery (heat absorption) using a heating medium in an inlet-side heat exchanger 13c before being supplied to the large capacity tank 5b. The heating medium that absorbs the heat by heat exchange in the inlet-side heat exchanger 13c is supplied to the heat storage portion 14b by a pump 15b for storing heat. The heat stored in the heat storage portion 14b is returned, via an outlet-side heat exchanger 13d, to the compressed air that is discharged from the large capacity tank 5b and supplied to the expander 7b.

In this configuration, the heat generated in the compressors 4a and 4b is recovered from the compressed air before it is supplied to the tanks 5a and 5b and returned to the compressed air before it is supplied to the expanders 7a and 7b, thereby enabling improvement of charge and discharge efficiency. That is, energy efficiency can be improved by preventing energy loss due to heat emission of the compressed air in the tanks 5a and 5b.

Regarding the leveling method of the CAES power generation device 1 and the control method thereof, the fourth embodiment is the same as the third embodiment in leveling out both the long-period and short-period variations.

The device may further comprise a heating mechanism not shown at the outlets of the tanks 5a and 5b. According to this configuration, the charge and discharge efficiency can be improved by heating air right before expansion. The compressed air loses energy by radiating heat in the tanks, but can regain the lost energy by receiving heat energy generated by heating of the heating mechanism. Further, if a heat source such as exhaust heat is available in another system not shown, such exhaust heat can be effectively utilized. Further, the device may comprise a plurality of small capacity tanks as shown in the first embodiment.

Fifth Embodiment

Figure 11:
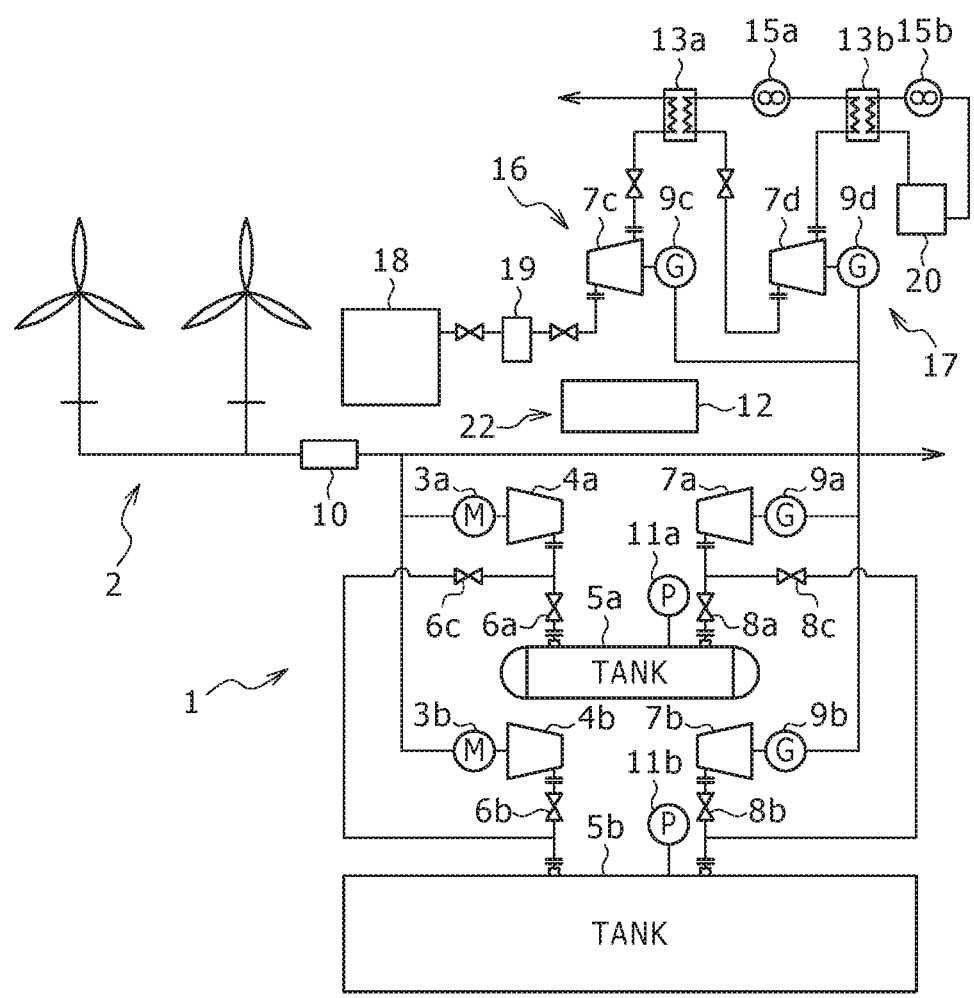
FIG. 11 is a schematic block diagram illustrating a compressed air energy storage (CAES) power generation device of a fifth embodiment.

FIG. 11 shows a CAES power generation device 1 of a fifth embodiment. The CAES power generation device 1 of the present embodiment has the same configuration as the first embodiment in FIG. 1 except for parts related to a vapor-driven generator 16 and a binary generator 17. Thus, parts having the same configuration as shown in FIG. 1 are designated by the same reference numerals and explanations thereof are omitted.

By referring to FIG. 11, the CAES power generation device 1 of the fifth embodiment comprises single small capacity tank 5a and single large capacity tank 5b. The tanks 5a and 5b are connected to motors 3a and 3b, compressors 4a and 4b, expanders 7a and 7b, and generators 9a and 9b, respectively. In the present embodiment, the device comprises four generators 9a to 9d, which include, additionally to generators 9a and 9b of the CAES system, the vapor-driven generator 16 (generator 9c) that generates power by receiving vapor from a separate vapor source 18 and the binary generation system 17 as a generator 9d.

The vapor-driven generator 16 in FIG. 11 generates power by receiving vapor generated in the vapor source 18. During this process, the vapor generated in the vapor source 18 is removed of moisture by a drain separator 19 and then supplied to the vapor-driven generator 16. Power generated by the vapor-driven generator 16 is combined with power generated by the CAES power generation device 1 and supplied to a system not shown.

The binary generation system 17 is a power generation system in which a medium having a low boiling point is heated and evaporated by a heat source and vapor thus generated turns, for example, a turbine. As the medium having a low boiling point, for example, an organic substance such as pentane or isobutane, alternative for chlorofluorocarbon, a mixed solution of ammonia and water, and the like may be used. After driving the vapor-driven generator 16, the vapor (e.g., about 120° C.) undergoes heat exchange with a medium having a low boiling point in a heat exchanger 13a. The medium having a low boiling point is evaporated by heat obtained in the heat exchanger 13a and the vapor thus generated is supplied to the expander 7d connected to generator 9d to generate power. The vapor expanded in the expander 7d is heat-absorbed in the heat exchanger 13b and becomes condensed. The condensed medium having a low boiling point is then supplied to the heat exchanger 13a by a pump 15a. Cooling water having undergone heat exchange with the medium having a low boiling point in the heat exchanger 13b is supplied to a cooling tower 20 and cooled. The cooled cooling water is supplied to the heat exchanger 13b by a pump 15b.

According to the configuration of the fifth embodiment, the CAES power generation device 1 comprises the separate external power generators (the vapor-driven generator 16 and the binary generation system 17) in addition to its own power generator. Thus, the device can securely maintain its power generation output even when output of the wind-power generation device 2 is unexpectedly overly unstable due to a failure, a prolonged stop, and the like, or is unexpectedly too low.

Regarding the leveling method of the CAES power generation device 1 and the control method thereof, the fifth embodiment is the same as the third embodiment in leveling out both the long-period and short-period variations.

In each embodiment described herein, the number of the compressors is equal to the number of the expanders. However, the numbers and capacities of the compressors and the expanders are not necessarily to be identical. The compressors may be made smaller (or in less number) while the expanders may be made larger (or in more number), or vice versa.

In each embodiment described herein, the generation device 2 uses wind power as the natural energy. However, the CAES power generation device 1 of the present invention is not limited thereto. Specifically, any natural energy that is constantly (or repeatedly) replenished by natural forces, such as wind power, solar light, solar heat, wave power or tidal power, water stream or tidal current, and geothermal heat, may be used. The present invention is, however, particularly effective in wind power generation and solar power generation, of which output fluctuates intensively with a weather condition.

EXPLANATION OF REFERENCE NUMERALS

1 Compressed air energy storage power generation device (CAES power generation device)
2 Wind-power generation device
3a, 3b, 3c Motors
4a, 4b, 4c Compressors
5a, 5b, 5c Tanks
6a, 6b, 6c, 6d, 6e, 6f Injection-side valves
7a, 7b, 7c Expanders
8a, 8b, 8c, 8d, 8e, 8f Discharge-side valves
9a, 9b, 9c Generators
10 Output sensor
11a, 11b, 11c Pressure sensors
12 Control device
13a, 13b, 13c, 13d Heat exchangers
14a, 14b Heat storage portions
15a, 15b Pumps
16 Vapor-driven generator
17 Binary generator
18 Vapor source
19 Drain separator
20 Cooling tower
21a, 21b Tank-interconnecting air supply valves
22 Control means

The invention claimed is:

1. A compressed air energy storage power generation device, comprising:
a plurality of motors driven by power generated using natural energy, the motors being connected electrically in parallel to each other;
a plurality of compressors for compressing air, mechanically connected to the motors;
at least two tanks of different capacities for storing the air compressed by the compressors;
a plurality of expanders driven by the compressed air supplied from the tanks;
a plurality of generators mechanically connected to the expanders, the generators being connected electrically in parallel to each other;
an injection-side valve for switching the tanks to be supplied with the compressed air from the compressor;
a discharge-side valve for switching the expanders to be supplied with the compressed air from the tank; and
a control means performing control for leveling out both a long-period and short-period power variations caused in power generated by the natural energy by using the tank having a relatively large capacity to cope with the long-period power variation and using the tank having a relatively small capacity to cope with the short-period power variation by opening and closing the injection-side valve and the discharge-side valve, thereby outputting power according to power demand.

2. The compressed air energy storage power generation device according to claim 1,
wherein the tank having a relatively small capacity, of the at least two tanks of different capacities, has a capacity to generate power continuously for less than an hour and the tank having a relatively large capacity, of the at least two tanks of different capacities, has a capacity to generate power continuously for one hour or more.

3. The compressed air energy storage power generation device according to claim 1,
wherein the control means performs control for leveling out the long-period and short-period power variations based on a long-period demand curve and a short-period standard curve, respectively, thereby outputting power according to power demand.

4. The compressed air energy storage power generation device according to claim 1
wherein at least one of the plurality of compressors which is connected to the tank having a relatively small capacity is a screw type and at least one of the plurality of expanders which is connected to the tank having a relatively small capacity is a screw type.

5. The compressed air energy storage power generation device according to claim 4,
wherein at least one of the plurality of compressors which is connected to the tank having a relatively large capacity is a screw type and at least one of the plurality of expanders which is connected to the tank having a relatively large capacity is a screw type.

6. The compressed air energy storage power generation device according to claim 1,
wherein at least one of the compressor and the expander, connected to the tank having a relatively large capacity, is a turbo type and both the compressor and the expander, connected to the tank having a relatively small capacity, are the screw type.

7. The compressed air energy storage power generation device according to claim 1,
wherein at least one of the plurality of compressors has a relatively small capacity and at least other one of the plurality of compressors has a relatively large capacity and at least one of the plurality of expanders has a relatively small capacity and at least other one of the plurality of expanders has a relatively large capacity, and
said compressor having a relatively small capacity and said expander having a relatively small capacity are used for coping with the short-period power variation and said compressor having a relatively large capacity and said expander having a relatively large capacity are used for coping with the long-period power variation.

8. The compressed air energy storage power generation device according to claim 1, comprising:
an inlet-side heat exchanger at an inlet of the tank for heat-exchanging between air whose temperature is raised by compression in the compressor and a heating medium;
a heat storage portion for storing the heating medium heat-exchanged in the inlet-side heat exchanger; and
an outlet-side heat exchanger at an outlet of the tank for heat-exchanging between the air discharged from the tank and the heating medium discharged from the heat storage portion, thereby heating the air.

9. The compressed air energy storage power generation device according to claim 1, further comprising an external generator separately from the plurality of generators of the device at an output portion of the plurality of generators of the device for generating power when the power generated using the natural energy is extremely unstable or too low.

10. The compressed air energy storage power generation device according to claim 1,
wherein a tunnel of mines or an underground cavity is used as the tank having a relatively large capacity.

11. The compressed air energy storage power generation device according to claim 1,
wherein the control means comprises:
the injection-side valve for switching the tanks to be supplied with the compressed air from the compressor;
the discharge-side valve for switching the expanders to be supplied with the compressed air from the tank;
an output sensor for measuring power generation output of the natural energy;
a pressure sensor for measuring a pressure inside the tank; and
a control device for opening and closing the injection-side valve and the discharge-side valve based on measurement values of the output sensor and the pressure sensor.

12. A compressed air energy storage power generation method of a compressed air energy storage power generation device, the device comprising:
a plurality of motors driven by power generated using natural energy, the motors being connected electrically in parallel to each other;
a plurality of compressors for compressing air, mechanically connected to the motors;
at least two tanks of different capacities for storing the air compressed by the compressors;
a plurality of expanders driven by the compressed air supplied from the tanks;
a plurality of generators mechanically connected to the expanders, the generators being connected electrically in parallel to each other,
an injection-side valve for switching the tanks to be supplied with the compressed air from the compressor; and
a discharge-side valve for switching the expanders to be supplied with the compressed air from the tank;
the method performing control for leveling out both a long-period and short-period power variations caused in power generated by the natural energy by using the tank having a relatively large capacity to cope with the long-period power variation and using the tank having a relatively small capacity to cope with the short-period power variation by opening and closing the injection-side valve and the discharge-side valve, thereby outputting power according to power demand.

* * * * *